US007921197B2

(12) United States Patent
Soundararajan

(10) Patent No.: US 7,921,197 B2
(45) Date of Patent: Apr. 5, 2011

(54) DYNAMIC CONFIGURATION OF VIRTUAL MACHINES

(75) Inventor: Govindarajan Soundararajan, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 318 days.

(21) Appl. No.: 12/274,186

(22) Filed: Nov. 19, 2008

(65) Prior Publication Data

US 2010/0125667 A1 May 20, 2010

(51) Int. Cl.
*G06F 15/173* (2006.01)

(52) U.S. Cl. .......... 709/223; 718/106; 717/124; 714/38
(58) Field of Classification Search .................... 709/223
See application file for complete search history.

(56) References Cited

U.S. PATENT DOCUMENTS

| 6,662,312 | B1 * | 12/2003 | Keller et al. ............ 714/38 |
| 2005/0223362 | A1 * | 10/2005 | Whitlock et al. ........ 717/126 |
| 2007/0101323 | A1 * | 5/2007 | Foley et al. ............ 718/1 |
| 2007/0266433 | A1 * | 11/2007 | Moore ................... 726/15 |
| 2008/0244525 | A1 * | 10/2008 | Khalil et al. ........... 717/124 |
| 2008/0250407 | A1 * | 10/2008 | Dadhia et al. .......... 718/1 |
| 2009/0106405 | A1 * | 4/2009 | Mazarick et al. ........ 709/222 |

* cited by examiner

*Primary Examiner* — Hassan Phillips
*Assistant Examiner* — Christopher D Biagini

(57) ABSTRACT

A computer implemented method for configuring virtual internal networks for testing is provided. The method includes deploying a virtual firewall and deploying a public switch enabling access to an external local area network through a first interface of the virtual firewall. A private switch enabling access to a plurality of virtual machines through a second interface of the virtual firewall is provided. The plurality of virtual machines define a private network behind the firewall. A network address is assigned to the virtual firewall and a private address is assigned to each of the virtual machines. The plurality of virtual machines are then tested through a test launcher in communication with the public switch.

17 Claims, 5 Drawing Sheets

ESX Hostname 1
    Network address leased
        PID of calling process

ESX Hostname 2
    Network address leased
        PID of calling process

.

.

.

ESX Hostname N
    Network address leased
        PID of calling process

DYNAMIC CONFIGURATION OF VIRTUAL MACHINES

BACKGROUND

With any quality assurance engineer or information technology administrator, it is a common scenario to qualify products and test applications. These tests are typically performed in an isolated manner so that the external network is not impacted by the tests being performed. With reference to virtualized products, the same holds true. Testing in internal networks helps in isolating the external local area network from any instabilities that could arise as a result of these tests. It should be appreciated that in some instances, malformed packets or other test applications need to be contained so as not to harm the external network.

Configuring one or two internal networks manually, with a firewall/router virtual appliance providing connectivity to the internal local area network from the external local area network it is not a labor intensive activity. It should be noted that the connectivity is important if the test engineer has to launch tests from a host in the external local area network. However, this manual configuration becomes daunting and even impossible to maintain and track if the number of servers multiply and the virtual machines are distributed across all these servers. One other shortcoming of the manual tracking method is that the test engineer can lose track of the network configuration if the virtual machines and/or networks have to be provisioned and destroyed dynamically.

It is within the context of these problems that the invention arises.

SUMMARY

Embodiments of the present invention provide methods, systems, and computer implemented systems that provide functionality for efficiently testing virtual machines. The testing is performed through a local area network (LAN) and the virtual machines are maintained in a private network accessible through the LAN so that the testing does not impact the stability of the LAN. It should be appreciated that the present invention can be implemented in numerous ways, such as a process, an apparatus, a system, a device or a method on a computer readable medium. Several inventive embodiments of the present invention are described below.

In one embodiment, a computer implemented method for configuring virtual internal networks for testing is provided. The method includes deploying a virtual firewall and deploying a public switch enabling access to an external local area network through a first interface of the virtual firewall. A private switch enabling access to a plurality of virtual machines through a second interface of the virtual firewall is provided. The plurality of virtual machines define a private network behind the firewall. A network address is assigned to the virtual firewall and a private address is assigned to each of the virtual machines. In one embodiment, the network address is translated by a DHCP module within the virtual firewall. The plurality of virtual machines are then tested through a test launcher in communication with the public switch.

In another embodiment, a method for testing virtual machines is provided. The method includes assigning an Internet Protocol (IP) address to each server associated with corresponding virtual machines, and configuring a dynamic host configuration protocol (DHCP) module within a virtual firewall with network addresses for the corresponding virtual machines, the network addresses supplied to the DHCP module through a test launcher in communication with a database maintaining the IP addresses and the network addresses. A test of the virtual machines is initiated from the test launcher, wherein the test launcher is located on a local access network (LAN) connecting each server and the virtual machines are located within private networks accessible through the LAN via the corresponding server. In each of the embodiments described herein, the method operations may be embodied as program instructions on a computer readable medium.

BRIEF DESCRIPTION OF THE DRAWINGS

The invention may best be understood by reference to the following description taken in conjunction with the accompanying drawings.

FIG. 3B illustrates one exemplary rendition of a Table stored within the database.

DETAILED DESCRIPTION

Broadly speaking, the embodiments of the present invention provide methods and computer implemented systems that enable the automatic configuration and provisioning of virtual internal networks in ESX hosts in order to prepare the networks for virtual machine testing and perform the test without exposing an external LAN to the testing operations. In one embodiment, the system is configured so that a private network is constructed and the virtual machines are accessible from the outside but cannot "see" the external environment. Thus, any of the testing performed is isolated to the internal networks and an malformed packets, etc., necessary for the testing remains isolated from the external LAN. In this manner, the entities on the external LAN are not subject to instability due to the testing. The following description provides numerous specific details set forth in order to provide a thorough understanding of the present invention. It will be apparent, however, to one skilled in the art that the present invention may be practiced without some or all of these specific details. Operations may be done in different orders, and in other instances, well known process operations have not been described in detail in order not to unnecessarily obscure the present invention. Several exemplary embodiments of the invention will now be described in detail with reference to the accompanying drawings.

The embodiments described herein allow for automatic configuration and provisioning of virtual internal networks in ESX hosts and prepares them for virtual machine testing. On any ES host where an internal network has to be configured, a Firewall virtual machine (VM) is deployed from a template maintained by a Virtual Center (VC) server. This forms the first step of the automation process. The firewall VM is configured with two virtual network interfaces and has a firewall application and a dynamic host configuration protocol (DHCP) server installed. In one embodiment, during deployment of the Firewall virtual machine, it is configured in such a way that one network interface is connected to the external local area network through a public or external switch and the other interface is connected to a private or an internal switch.

Figure 1:
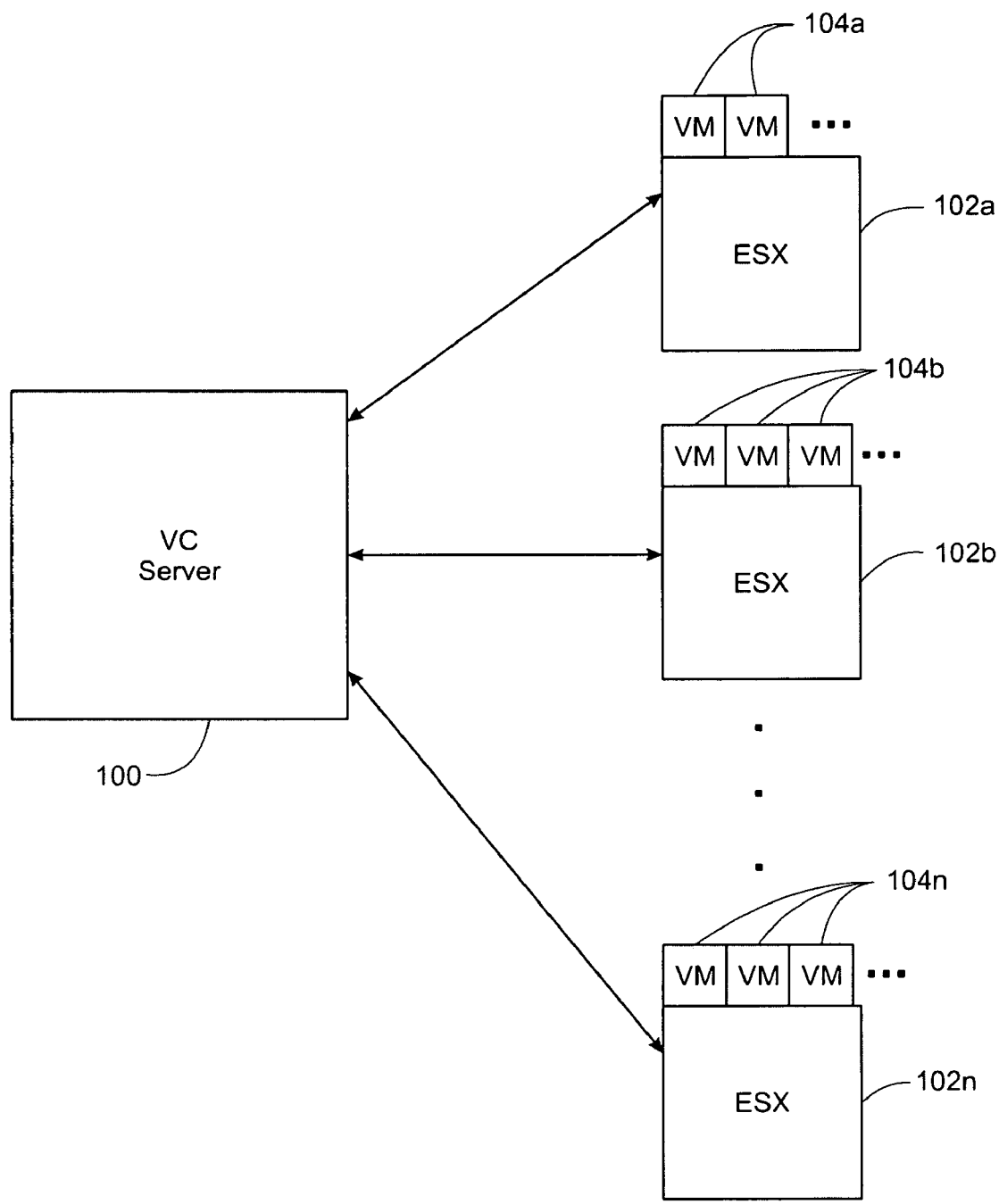
FIG. 1 is a simplified schematic diagram of an overview of a virtual infrastructure in accordance with one embodiment of the invention.

FIG. 1 is a simplified schematic diagram of an overview of a virtual infrastructure in accordance with one embodiment of the invention. VC server 100 is in communication with a plurality of ESX servers 102a through 102n. Each ESX server 102a through 102n is associated with a corresponding plurality of virtual machines 104a through 104n. The embodiments described below provide for the efficient testing of the virtual machines in a manner that protects other entities on the network. One skilled in the art will appreciate that the virtualized entities mentioned herein are software modules in one embodiment. That is, the virtual firewall, virtual switches, DHCP module, etc., may be embodied as software through the products of the assignee. Further details on the virtualized items may be found on the assignee's website. In addition, the testing performed herein may include bench testing, fault testing, virtual networking testing, etc. In essence, any testing associated with the functional testing on a guest operating system is included in the testing mentioned herein. The private network described in the configurations below isolates the testing so that testing conditions that may cause instability on the LAN are contained.

Figure 2:
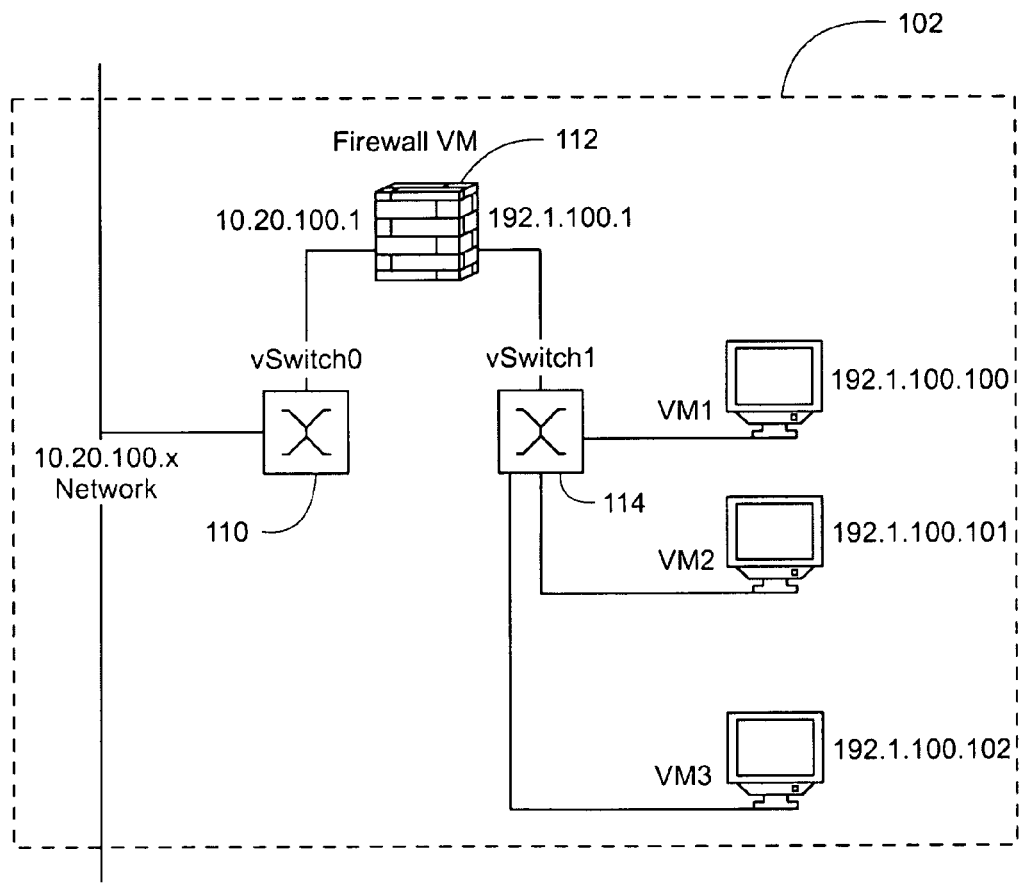
FIG. 2 is a simplified schematic diagram of a setup for an ESX host in accordance with one embodiment of the invention.

FIG. 2 is a simplified schematic diagram of a setup for an ESX host in accordance with one embodiment of the invention. Within ESX server 102 resides v switches 110 and 114. v switch 110 provides access to an external local area network. Firewall VM 112 includes a DHCP server in one embodiment. Firewall VM 112 provides protected access to the internal portion of ESX server 102, i.e., the portion behind the virtual firewall. vSwitch 114 provides access to each of virtual machines 116a through 116c. In one embodiment, the DHCP server's scope in the firewall VM 112 is dynamically configured by calling a software module that looks up a local database for a free network address, as discussed in more detail with reference to FIGS. 3A and 3B. Once a free network address is obtained, an entry is made in the database and the network address is assigned to the Firewall VM 112 in one embodiment. In the embodiments described herein, IP forwarding is enabled for the network address in the firewall virtual manager and the test designer can reach the virtual manager from the external local area network. It should be appreciated that when another ESX host has to be configured similarly, a new network address is returned and an entry is simultaneously made in the database so that no duplicate network addresses exist.

FIG. 3 is a simplified schematic diagram providing an overview of the architecture for dynamically configuring virtual machines in internal networks on ESX hosts in accordance with one embodiment of the invention. In the architecture of FIG. 2, ESX servers 200 through 206 are provided. It should be appreciated that the number of ESX servers is not limited to four servers, as any number of ESX servers may be included. Each ESX server 200-206 includes a public switch 110a through 110d, a private switch 114a through 114d, a firewall virtual manager 112a through 112d and corresponding virtual machines 116a-1 through 116d-3, respectively. Test launcher 220 is in communication with each ESX server 102a through 102d via the corresponding private switch. Test launcher 220 is also in communication with database 222. Accordingly, when a design engineer desires to perform a test on the virtual machines, the test launcher will create the corresponding vSwitch and firewall virtual manager. The test launcher will then access database 222 which maintains a table of free networks. FIG. 3B illustrates one exemplary rendition of a Table stored within database 222. Table 280 is constructed to include the ESX hostname and the network addresses leased to the ESX. In addition, a process identification (PID) is assigned with each calling process. One skilled in the art will appreciate that the PID status may be tracked to determine whether a test has been completed.

Figure 3A:
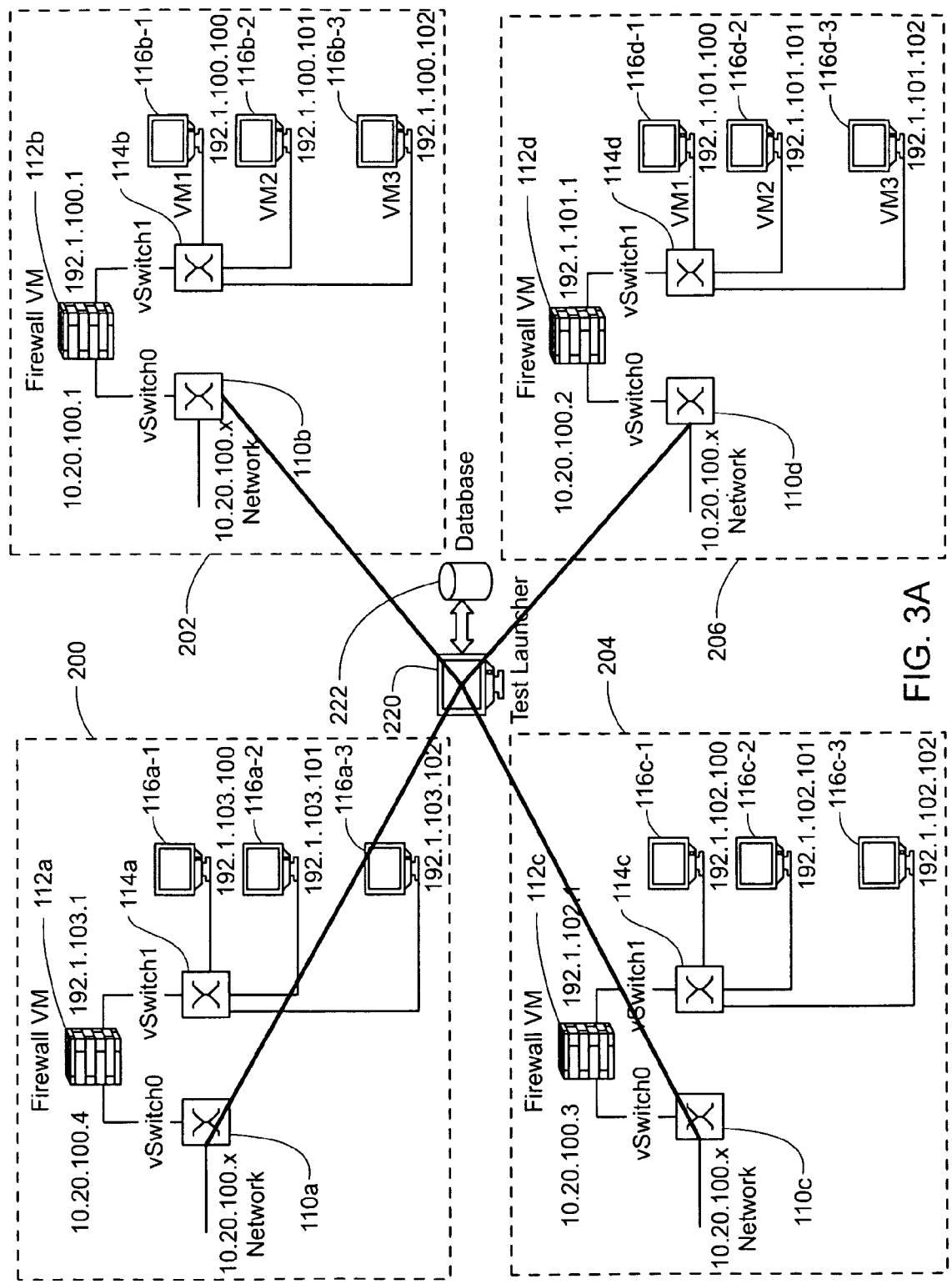
FIG. 3A is a simplified schematic diagram providing an overview of the architecture for dynamically configuring virtual machines in internal networks on ESX hosts in accordance with one embodiment of the invention.

Returning to FIG. 3A, a network address will be assigned to the internal network corresponding to the side of the firewall virtual manager that includes the virtual machines. In one embodiment, the test launcher 220 initiates a test on one of the ESX servers. For example, if a test was to be performed on ESX 200, the test launcher 220 would access database 222 in order to dynamically configure the network addresses. Database 222 will provide a list of free network addresses and a process ID (PID) for each of the networks in use. As illustrated in FIG. 3A, the network 10.20.100 is the public network that the test launcher 220 communicates with each of the ESX 200 through 206. Firewall VM 112a and the DHCP server within the firewall VM is assigned an Internet protocol (IP) address of 10.20.100.4 and an internal network address of 192.1.103.1 to be utilized with each of the virtual machines 116a-1 through 116a-3 behind firewall VM 112a. Virtual machines 116a-1 and through 116a-3 are assigned network addresses 192.1.103.100 through 192.1.103.102, respectively within the private network. Accordingly, once the IP forwarding is enabled for this network address in the firewall VM, the virtual machines can be reached from the external local area network, e.g., from test launcher 220. When another ESX server has to be configured similarly, a new network address is returned and an entry is simultaneously made in the database 204 so that no duplicate network exists. In one embodiment, database 204 holds the following information, ESX host name, IP address, network address leased and PID of the calling process as illustrated in FIG. 3B. In another embodiment, once the calling process/script completes executing the test, the test launcher removes from the database the entry pertaining to the PID, thereby releasing the network address for future use. It should be appreciated that the program running in the test launcher queries the database before configuring the internal networks. One skilled in the art will appreciate that the following embodiments are not restricted to a test environment.

Figure 4:
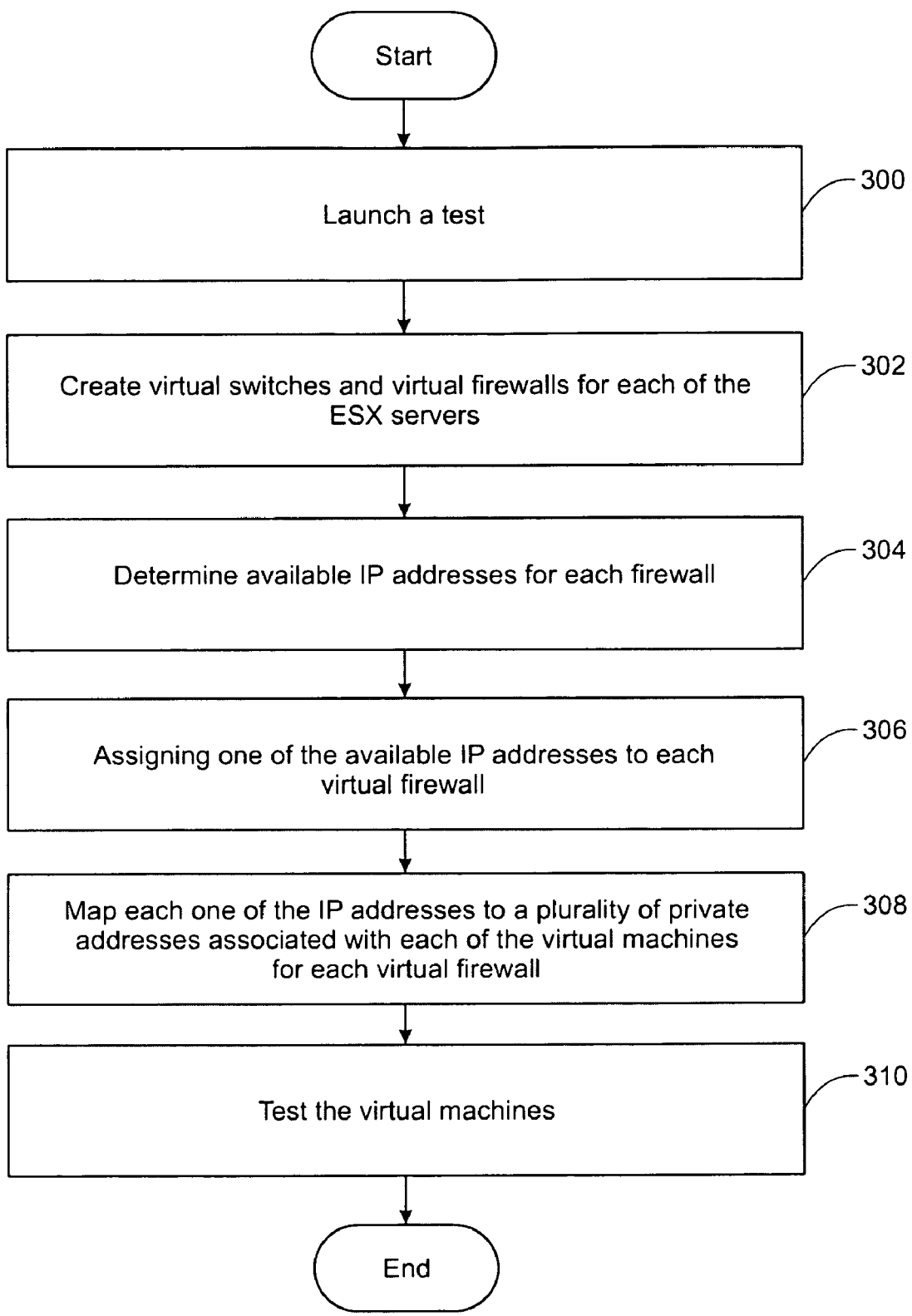
FIG. 4 is a simplified schematic diagram illustrating a flow chart for a method of dynamically configuring network addresses for a test environment with multiple ESX servers in accordance with one embodiment of the invention.

FIG. 4 is a simplified schematic diagram illustrating a flow chart for a method of dynamically configuring network addresses for a test environment with multiple ESX servers in accordance with one embodiment of the invention. The method initiates with operation 300 where a test is launched. Once the test is launched, virtual switches will be created for each of the ESX servers, as well as the virtual firewalls in operation 302. The method then advances to operation 304 where available Internet Protocol (IP) addresses for each firewall VM are determined. When obtaining the IP address, the DHCP server in the virtual firewall is provided IP addresses based on the available addresses within a database communicating with the test launcher. In operation 304 a script running on the test launcher queries the database in order to ascertain which network addresses are free so that they may be assigned to the DHCP server within the firewall in one embodiment. In operation 306 one of the available IP addresses is assigned or leased to each virtual firewall as illustrated in FIG. 3A. Network addresses may then be assigned to the DHCP server within the firewall and these addresses are then obtained by each guest operating system or virtual machine as they are instantiated in operation 308. In one embodiment, each one of the IP addresses is mapped to a plurality of private addresses (network addresses) associated with each of the virtual machines for each virtual firewall under operation 308. In one embodiment, the DHCP server is reconfigured to lease IP addresses in the network range, e.g., the first IP address in the network range is assigned to the internal interface of the firewall. In operation 310 the testing is performed for the virtual machines under the isolated conditions of the private network. The process identification assigned to each test is monitored to determine whether to release the network addresses for future testing.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A computer implemented method for configuring virtual internal networks for testing, comprising:
    deploying a virtual firewall within a server;
    deploying a public switch within the server enabling access to an external local area network through a first interface of the virtual firewall;
    deploying a private switch within the server enabling access to a plurality of virtual machines within the server through a second interface of the virtual firewall, the plurality of virtual machines defining a private network;
    assigning a network address to the virtual firewall;
    assigning a private address to each of the virtual machines; and
    testing the plurality of virtual machines through a test launcher in communication with the public switch;
    wherein the private addresses are assigned by a dynamic host configuration protocol (DHCP) server within the virtual firewall and the private addresses are supplied to the DHCP server by the test launcher.

2. The method of claim 1, further comprising:
    querying a database in communication with the test launcher for the network address for the virtual firewall.

3. The method of claim 2, further comprising:
    configuring the DHCP server within the virtual firewall with the network address.

4. The method of claim 1, wherein the public and private switches are virtual switches.

5. The method of claim 2, wherein the database maintains the network address, private addresses leased to the network address, and a process identification indicating whether a test process for the private addresses is active.

6. A computer implemented method for testing virtual machines located within servers on an external local area network (LAN), comprising:
    launching a test for the virtual machines;
    creating virtual switches and a virtual firewall for each server on the LAN;
    determining available Internet Protocol (IP) addresses for each virtual firewall;
    assigning one of the available IP addresses to each virtual firewall;
    mapping each one of the IP addresses to a plurality of private addresses assigned to each of the virtual machines for each virtual firewall; and
    testing the virtual machines through a test launcher in communication with a virtual switch for each server on the LAN;
    wherein the private addresses are assigned by a dynamic host configuration protocol (DHCP) module within each virtual firewall and the private addresses are supplied to each DHCP module by the test launcher.

7. The method of claim 6, wherein the testing includes performing one of bench testing or fault testing.

8. The method of claim 6, wherein each DHCP module is configured to translate the IP addresses to the private addresses.

9. The method of claim 6, wherein the IP addresses are maintained in a database in communication with a test launcher launching the test.

10. The method of claim 9, wherein the database assigns a process identification for the test and associates the process identification with the private addresses.

11. The method of claim 10, wherein the process identification indicates when the test completes, thereby releasing the private addresses for assignment with another IP address.

12. The method of claim 10, wherein the DHCP module is provided the IP addresses from the database by the test launcher.

13. The method of claim 6, wherein the creating virtual switches and a virtual firewall for each server on the LAN includes,
    creating a public switch enabling access to the LAN through a first interface of the virtual firewall; and
    creating a private switch enabling access to the virtual machines through a second interface of the virtual firewall, wherein virtual machines associated with the virtual firewall define a private network.

14. A method for testing virtual machines, comprising:

assigning an Internet Protocol (IP) address to a virtual firewall within each server on a local area network (LAN), each server associated with corresponding virtual machines;

configuring a dynamic host configuration protocol (DHCP) module within each virtual firewall with private network addresses for the corresponding virtual machines, the private network addresses supplied to the DHCP module through a test launcher in communication with a public virtual switch within each server and a database maintaining the IP addresses and the private network addresses;

wherein each DHCP module assigns the private addresses to corresponding virtual machines; and initiating a test of the virtual machines from the test launcher, wherein the test launcher is located on the LAN and the virtual machines are located within private networks accessible through the LAN via the corresponding server.

15. The method of claim 14, further comprising:

creating a virtual switch between the virtual firewall and the corresponding virtual machines.

16. The method of claim 15, wherein the virtual switch enables access to the corresponding virtual machines from the virtual firewall and disables access for the corresponding virtual machines to the LAN external to the virtual firewall.

17. The method of claim 14, further comprising:

tracking progress of the test through status of a process identification; and releasing the network addresses for the corresponding virtual machines upon completion of the test.

* * * * *